United States Patent
Koschier et al.

(12)

(10) Patent No.: US 6,234,912 B1
(45) Date of Patent: May 22, 2001

(54) HIGH-STIFFNESS COMPOSITE SHAFT

(75) Inventors: Angelo V. Koschier, Lynnfield; James N. Fleck, Boxford; Hagen R. Mauch, Cambridge, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/391,037

(22) Filed: Sep. 7, 1999

(51) Int. Cl.[7] ........................................ F16C 3/00
(52) U.S. Cl. ............................. 464/183; 464/179
(58) Field of Search ................... 464/179, 180, 464/183, 185; 29/888.01, 428

(56) References Cited

U.S. PATENT DOCUMENTS

| | | | |
|---|---|---|---|
| 306,472 | * 10/1884 | Feith | 464/179 |
| 1,999,051 | * 4/1935 | Kennedy | 464/179 |
| 2,875,597 | * 3/1959 | Neubauer | 464/179 |
| 3,521,464 | * 7/1970 | Kidby | 464/180 |
| 3,769,813 | * 11/1973 | Okada | 464/181 |
| 4,238,540 | * 12/1980 | Yates et al. | 464/180 |
| 4,664,644 | * 5/1987 | Kumata et al. | 464/180 |
| 5,868,627 | * 2/1999 | Stark et al. | 464/183 |
| 5,924,531 | * 7/1999 | Stark et al. | 464/180 |
| 5,976,021 | * 11/1999 | Stark et al. | 464/180 |

\* cited by examiner

*Primary Examiner*—Lynne H. Browne
*Assistant Examiner*—Kenn Thompson
(74) *Attorney, Agent, or Firm*—Andrew C. Hess; Rodney M. Young

(57) ABSTRACT

A composite shaft whose construction and fabrication enable precise placement and orientation of reinforcement fiber bundles, enable close control of runout, and eliminate a separate joining operation for attaching mechanical drive couplings. The composite shaft generally includes an inner shell, a spacing member circumscribing and contacting the inner shell, and a bundle of fibers disposed in each of a number of longitudinally-extending cavities in the spacing member. The shaft also has an outer portion that encases the fiber bundles in the spacing member. The shaft preferably includes end pieces attached to the end of the shaft and adapted as mechanical coupling features. At least the end pieces, spacing member and fiber bundles are joined in a manner that defines a metal matrix surrounding and encasing the fiber bundles.

32 Claims, 2 Drawing Sheets

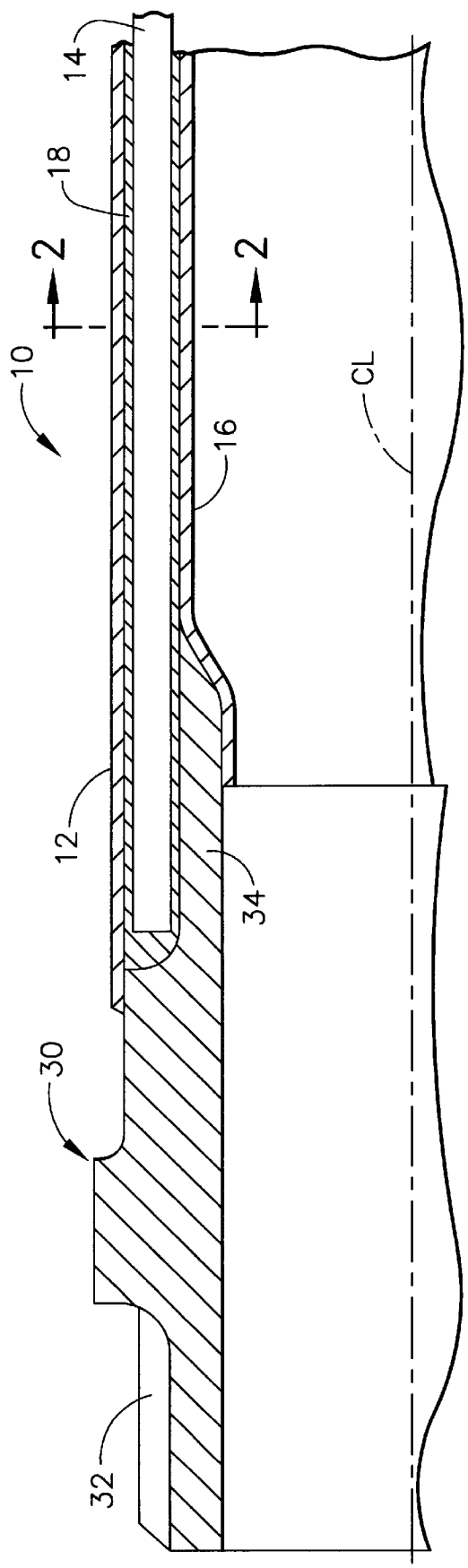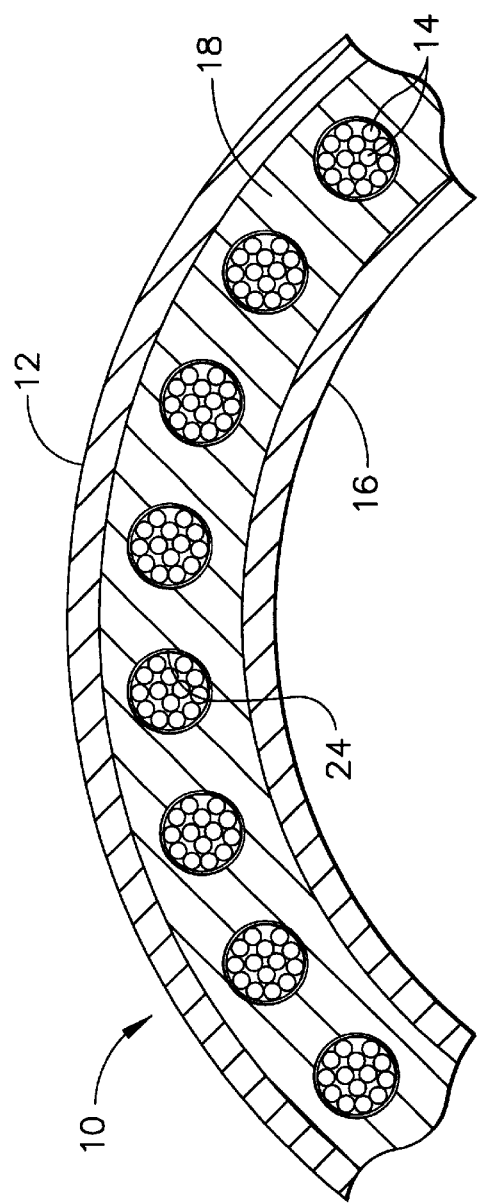

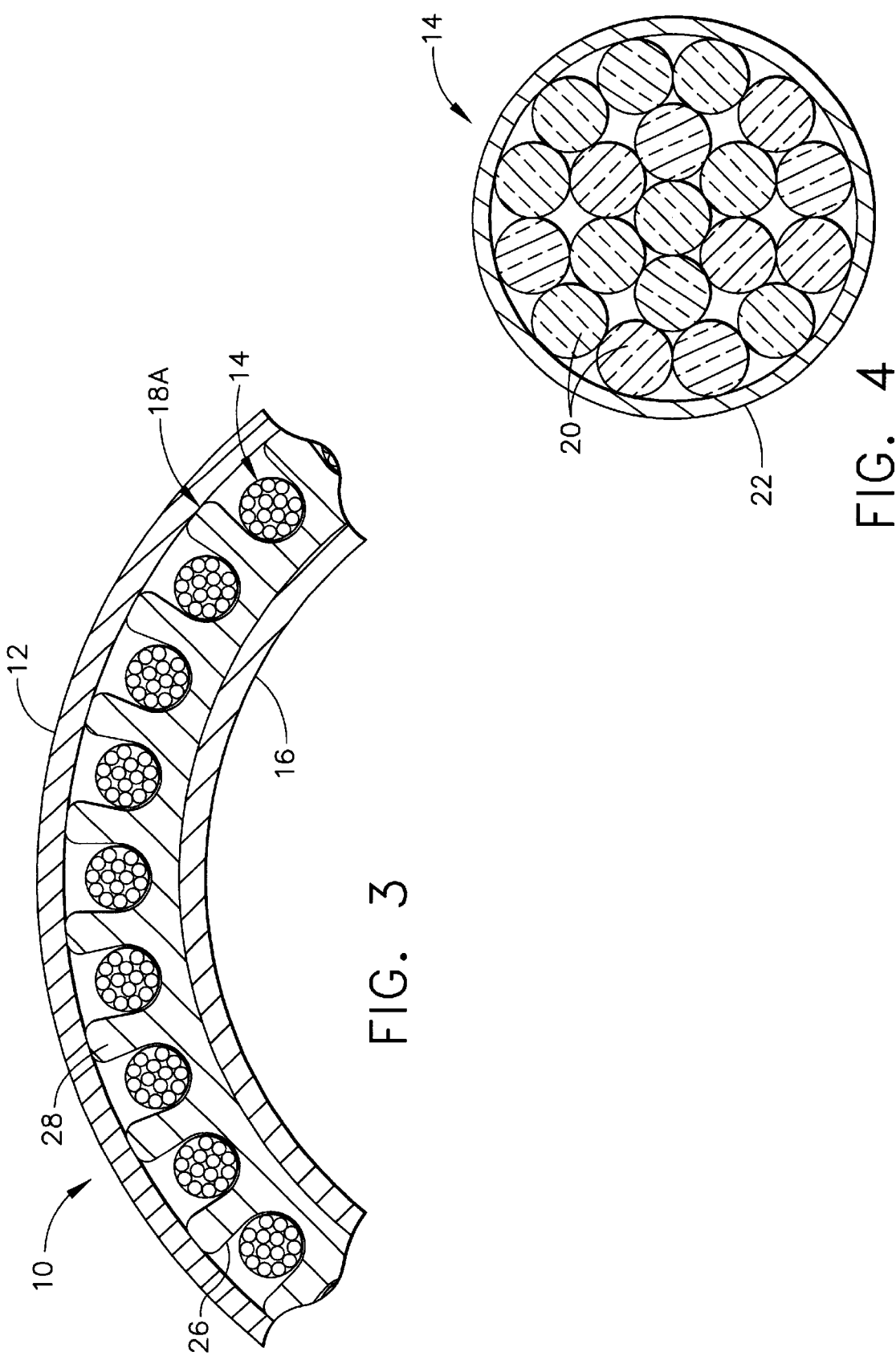

HIGH-STIFFNESS COMPOSITE SHAFT

FIELD OF THE INVENTION

The present invention relates to torque-carrying members. More particularly, this invention relates to a high-stiffness shaft for transmitting torque between large bearing spans at high rotational speeds and temperatures, such as a power turbine output shaft for a gas turbine engine.

BACKGROUND OF THE INVENTION

Shafts intended as torque-carrying members have been formed of metal matrix composite (MMC) materials. One example is a titanium composite shaft containing reinforcing fibers, such as silicon carbide or boron fibers. The shaft is fabricated by forming composite sheets of titanium foil and fibers using known consolidation processes, wrapping the resulting composite sheets around a mandrel, and then consolidating the sheets at high temperatures and pressures. While acceptable in many respects, this fabrication process does not easily lend itself to high volume production or allow uniform fiber distribution necessary to obtain the full benefit of the composite structure. Nor does the process enable the achievement of precise and repeatable material distribution and runouts required to balance the shaft. Accurate and repeatable balancing is an absolute requirement of particular concern for turbine output shafts of gas turbine engines. Finally, titanium matrix materials are generally not suitable for mechanical coupling features such as shaft splines, which necessitates separate fabrication steps during which an attachment with an appropriate coupling feature is brazed to one or both ends of the shaft. The separate fabrication steps are undesirable from the standpoint of production yields and processing costs.

Given the state of the art, it should be noted that composite materials offer a potential avenue to increase power output shaft stiffness, which is critical in terms of the dynamic performance of gas turbine engines. For example, higher shaft stiffness permits higher operational (turbine) speeds before critical speeds are reached, which allows for fewer turbomachinery stages and better turbine performance over larger bearing support spans. As a result, the stiffness of a turbine output shaft of a small gas turbine engine affects in one way or another the design of the compressor (e.g., axial or centrifugal), the number of turbine stages, type of rotor support bearings, bumper bearings on critical shafting, and bearing cooling and clearance control. A very high-stiffness output shaft can make possible significantly improved and lower-cost engine designs. However, shafts that exhibit greater stiffness and acceptable dynamic balance have been difficult to achieve.

BRIEF SUMMARY OF THE INVENTION

The present invention provides a composite shaft whose construction and fabrication enable precise placement and orientation of reinforcement fibers, enable close control of runout, and eliminate a separate joining operation for attaching mechanical drive couplings.

According to this invention, the composite shaft includes fiber bundles disposed in each of a number of longitudinally-extending cavities in a spacing member. The shaft also has an outer portion that encases the fiber bundles in the spacing member. The outer portion may be an integral portion of the spacing member, such that the cavities are internal channels within the spacing member. Alternatively, the outer portion can be a tubular-shaped outer shell circumscribing the spacing member, in which case the cavities are external slots in a radially-outward surface of the spacing member. Finally, the shaft preferably includes an inner shell circumscribed by the spacing member, and extensions attached to both ends of the shaft and adapted as mechanical coupling features. At least the spacing member and fiber bundles are joined in a manner that defines a metal matrix surrounding and encasing the reinforcement fiber bundles, yielding a shaft whose mechanical properties can be modeled accurately by analysis because of the precise placement of the fiber bundles in the metal matrix.

In view of the above, it can be seen that a significant advantage of this invention is that the shaft can be fabricated to have a very stiff composite structure, particularly if titanium is employed as the main structural subcomponents, e.g., the inner shell, spacing member and outer portion of the shaft, to provide a titanium matrix in which reinforcement fiber bundles can be oriented in any desired manner within the cavities defined in the titanium matrix. In addition, using a reusable mold the shaft can be accurately produced from the subcomponents, which are prefabricated and then diffusion bonded together to achieve high dimensional precision and accurate placement of the fiber bundles. As a result, the present invention enables the manufacture of shafts that are more likely to have low levels of imbalance and can be readily balanced through material removal from balance lands. Another advantage of the invention is that expensive titanium powders and foils are no longer required.

Other objects and advantages of this invention will be better appreciated from the following detailed description.

BRIEF DESCRIPTION OF THE DRAWINGS

FIG. 1 is a longitudinal cross-sectional view of a composite shaft assembly in accordance with this invention.

FIGS. 2 and 3 are diametrical cross-sectional views of the shaft of FIG. 1 in accordance with first and second embodiments of this invention.

FIG. 4 is a cross-sectional view of one of the fiber bundles depicted in FIGS. 1, 2 and 3, prior to hipping and diffusion bonding.

DETAILED DESCRIPTION OF THE INVENTION

The present invention provides a composite shaft 10 that is suitable for transmitting torque at high speeds in a high-temperature environment, as is the case for a turbine output shaft of a gas turbine engine. FIG. 1 represents a longitudinal cross-section of one end of the shaft 10, while FIGS. 2 and 3 are diametrical cross-sections of alternative embodiments of the shaft 10. For application as a turbine output shaft, the shaft 10 is preferably a titanium matrix composite, though it is foreseeable that the structural advantages furnished by this invention could be applied to other matrix materials.

As depicted in FIG. 1, the shaft 10 includes a tubular-shaped inner shell 16 surrounded by a tubular-shaped spacing member 18 that contains a number of longitudinally-extending fiber bundles 14 shown in more detail in FIG. 4. The use of the inner shell 16 is preferred for ease of manufacture, but could be omitted depending on the assembly process and part geometries. As understood in the art, the fiber bundles 14 in combination with the surrounding matrix contribute torsional strength and stiffness to the shaft 10. The fiber bundles 14 are shown in FIG. 4 as being individual reinforcement fibers 20 contained within a casing shell 22.

The fiber bundles 14 can be formed of a variety of known fiber materials, including but not limited to silicon carbide, carbon, boron and other nonmetallic materials. The fibers 20 are appropriately cladded or sized to enable a structural bond to be formed between individual fibers 20 and casing shell 22 and to prevent direct fiber-to-fiber contact.

In accordance with a first embodiment shown in FIG. 2, the fiber bundles 14 are disposed within internal channels 24 formed within the spacing member 18, so that each bundle 14 is encased by the member 18 and adjacent bundles 14 are circumferentially spaced apart by the walls of the channels 24. In a second embodiment shown in FIG. 3, the bundles 14 are contained within grooves or slots 26 formed in the external surface of an alternative spacing member 18A, and then encased by a separate tubular-shaped outer shell 12 that surrounds the member 18A. With the embodiment of FIG. 3, adjacent bundles 14 are circumferentially spaced apart by radially extending ribs 28 defined between the slots 26. In each of these embodiments, the location and orientation of the fiber bundles 14 on the shaft 10 are precisely determined by the location and configuration of the channels 24 (FIG. 2) or slots 26 (FIG. 3). For example, the fiber bundles 14 can be oriented parallel to the axis of the member 18, or nonparallel to this axis in a spiral pattern around the circumference of the member 18.

Referring again to FIG. 1, the shaft 10 is shown as including an extension or end piece 30 equipped with splines 32 for mechanically coupling the shaft 10 to another component of the turbine engine, such as a turbine disk or coupling. At the end opposite the splines 32, the end piece 30 is formed to have an annular-shaped portion 34 that is sandwiched between and attached to the inner shell 16 and the spacing member 18, as will be described in greater detail below. A second end piece (not shown) would typically be provided at the opposite end of the shaft 10. The second end piece may be essentially identical to the end piece 30 shown, or configured differently such as with mechanical coupling features other than splines.

According to a preferred embodiment of this invention, the outer shell 12 (if present), inner shell 16 (if present) and spacing member 18 or 18A are all formed of titanium alloys. Suitable titanium alloys for these components include Ti-6Al-4V and Ti-6Al-2Sn-4Zr-2Mo, though it is foreseeable that titanium aluminides and other titanium alloys could be used. To attain the dimensional precision required to achieve the dynamic properties for the shaft, the outer shell 12, inner shell 16 and spacing member 18 are formed by precision forming techniques, such as known superplastic forming methods. Titanium is also preferred for the casing shells 22 for the fiber bundles 14, with a suitable alloy being Ti-6Al-4V. For compatibility with their casing shells 22, the fiber bundles are preferably individually clad with a metal compatible with titanium at elevated temperatures. The bundles 14 can then be diffusion bonded together and with their shells 22. Alternatively, individual fibers 20 can be assembled in a bundle, and the entire bundle clad to form a coherent fiber bundle encased in titanium, so that a discrete shell is not required.

The splined end of the end piece 30 shown in FIG. 1 is preferably formed of a material other than titanium for improved mechanical properties for the splines 32. Appropriately matching the coefficient of thermal expansion is important to assure compatibility between the end piece 30 and the titanium components of the shaft 10. In one embodiment, the end piece 30 is formed by a known rapid solidification plasma deposition process, in which titanium is transitioned to a material more suitable for mechanical connections, such as an iron-base or nickel base alloy, a particularly notable example being INCONEL 718 or INCO 909. For example, the annular-shaped portion 34 sandwiched between and attached to the inner shell 16 and spacing member 18 can be a titanium alloy such as Ti-6Al-4V, and the composition of the end piece 30 is continuously graded toward its opposite spline end, which is INCONEL 718. Using a suitable barrier to prevent the formation of intermetallics, other possible composition systems and methods of construction (e.g., explosive bonding) for the end piece 30 are possible and within the scope of this invention.

Once individually formed, the outer shell 12 (if used), inner shell 16 (if used), spacing member 18, fiber bundles 14 and end piece 30 (if compositionally graded as described above) are assembled together using a precision mold, and then preferably bonded together by known diffusion bonding techniques to produce a unitary titanium-fiber matrix (formed by the outer shell 12 (if used), inner shell 16 (if used), spacing member 18, casing shell 22 (if used), and end piece 30), which is reinforced with the fibers 20. In this manner, the shaft 10 produced by the individual components exhibits low levels of imbalance that can be readily corrected at the appropriate balance lands of the shaft 10 through material removal. Notably, diffusion bonding of a compositionally graded end piece 30 to the titanium components of the shaft 10 eliminates a joining operation that would otherwise be required.

While the invention has been described in terms of a preferred embodiment, it is apparent that other forms could be adopted by one skilled in the art. Therefore, the scope of the invention is to be limited only by the following claims.

What is claimed is:

1. A shaft comprising:
    a spacing member having longitudinally-extending cavities adjacent a surface thereof; and
    fiber bundles disposed in each of the cavities of the spacing member, each fiber bundle comprising a plurality of reinforcement fibers secured together, the spacing member defining a metal matrix that surrounds and is bonded to the fiber bundles.

2. A shaft according to claim 1, wherein the cavities are arranged in an annular-shaped pattern within a diametrical cross-section of the spacing member.

3. A shaft according to claim 1, wherein the cavities are internal channels within the spacing member.

4. A shaft according to claim 1, wherein the cavities are external slots in the surface of the spacing member.

5. A shaft according to claim 4, further comprising a tubular-shaped outer shell circumscribing and bonded to the spacing member, the outer shell and the spacing member defining a metal matrix that surrounds and is bonded to the fiber bundles.

6. A shaft according to claim 1, wherein each of the fiber bundles comprises a shell that encases the fibers.

7. A shaft according to claim 1, further comprising an extension attached to an end of the shaft.

8. A shaft according to claim 1, further comprising a tubular inner shell circumscribed by and bonded to the spacing member.

9. A shaft according to claim 8, further comprising an extension attached to an end of the shaft, the extension having an annular-shaped portion that is concentric with and bonded to and between the inner shell and the spacing member.

10. A shaft according to claim 1, wherein the shaft is a gas turbine engine output shaft.

11. A gas turbine engine output shaft comprising:
 a titanium-base inner shell having a tubular shape;
 a titanium-base spacing member circumscribing and joined to the inner shell, the spacing member having an annular-shaped pattern of longitudinally-extending cavities near a radially-outward surface thereof;
 fiber bundles disposed in each of the cavities of the spacing member, each fiber bundle comprising a plurality of reinforcement fibers encased with a titanium-base encasing shell;
 a titanium-base outer portion that encases the fiber bundles in the spacing member; and
 an extension attached to an end of the shaft;
 wherein the inner shell, the spacing member, the encasing shells, the outer portion and the extension define a metal matrix surrounding the reinforcement fibers.

12. A gas turbine engine output shaft according to claim 11, wherein the outer portion is an integral portion of the spacing member, and the cavities are internal channels beneath the radially-outward surface of the spacing member.

13. A gas turbine engine output shaft according to claim 11, wherein the cavities are external slots in the radially-outward surface of the spacing member, the outer portion is a tubular-shaped outer shell circumscribing and bonded to the spacing member, and the outer shell is bonded to the encasing shells of the fiber bundles.

14. A gas turbine engine output shaft according to claim 11, wherein the cavities and the fiber bundles therein are not coaxial with the spacing member.

15. A gas turbine engine output shaft according to claim 11, wherein the extension has an annular-shaped portion that is between, concentric with, and bonded to the inner shell and the spacing member.

16. A gas turbine engine output shaft according to claim 15, wherein the annular-shaped portion of the extension is formed of a titanium-base alloy, an opposite end of the extension is formed of a second material other than a titanium-base alloy, and the extension is compositionally graded from the titanium-base alloy to the second material between the annular-shaped portion and the opposite end of the extension.

17. A gas turbine engine output shaft according to claim 16, wherein the second material of the extension is a nickel-base or iron-base alloy.

18. A gas turbine engine output shaft according to claim 11, wherein the extension has an end opposite the annular-shaped portion, the end having a mechanical coupling means formed thereat.

19. A method of manufacturing a shaft, the method comprising the steps of:
 forming a spacing member having longitudinally-extending cavities adjacent a surface thereof;
 forming a plurality of fiber bundles, each fiber bundle comprising a plurality of reinforcement fibers;
 inserting the fiber bundles in the cavities of the spacing member; and then
 joining the spacing member to the fiber bundles so that the fiber bundles are encased in the spacing member and the spacing member defines a metal matrix that surrounds and is bonded to the fiber bundles.

20. A method according to claim 19, wherein the cavities are formed in the spacing member so as to be arranged in an annular-shaped pattern within a diametrical cross-section of the spacing member.

21. A method according to claim 19, wherein the cavities are formed as internal channels within the spacing member.

22. A method according to claim 19, wherein the cavities are formed as external slots in the surface of the spacing member.

23. A method according to claim 22, the method further comprising the step of forming an outer shell that is assembled with the spacing member to circumscribe the spacing member and circumferentially enclose the cavities, the outer shell and the spacing member defining a metal matrix that surrounds and is bonded to the fiber bundles after the joining step.

24. A method according to claim 19, wherein the cavities are formed in the spacing member so that the fiber bundles therein are not coaxial with the spacing member.

25. A method according to claim 19, further comprising the step of encasing each of the fiber bundles in a shell.

26. A method according to claim 19, further comprising the step of attaching an extension to an end of the shaft.

27. A method according to claim 19, further comprising the steps of:
 forming a tubular inner shell; and then
 placing the inner shell and the spacing member in a mold so that the spacing member circumscribes the inner shell;
 wherein as a result of the joining step, the inner shell and the spacing member are joined and define a metal matrix surrounding the reinforcement fibers.

28. A method according to claim 27, further comprising the step of attaching an extension to an end of the shaft, the extension having an annular-shaped portion that is concentric with and bonded to and between the inner shell and the spacing member during the joining step.

29. A method according to claim 28, wherein the annular-shaped portion is formed of a titanium-base alloy, an opposite end of the extension is formed of a second material other than a titanium-base alloy, and the extension is compositionally graded from the titanium-base alloy to the second material between the annular-shaped portion and the opposite end of the extension.

30. A method according to claim 29, wherein the second material of the extension is a nickel-base or iron-base alloy.

31. A method according to claim 19, wherein the shaft is a gas turbine engine output shaft.

32. A method of manufacturing a gas turbine engine output shaft, the method comprising the steps of:
 forming a titanium-base inner shell having a tubular shape;

forming a titanium-base spacing member having an annular-shaped pattern of longitudinally-extending cavities near a radially-outward surface thereof;

forming fiber bundles, each fiber bundle comprising a plurality of reinforcement fibers encased with a titanium-base encasing shell;

forming a titanium-base outer shell;

forming an extension;

inserting the fiber bundles in the cavities of the spacing member;

placing the inner shell, the spacing member, the outer shell and the extension in a mold so that the spacing member circumscribes the inner shell and the outer shell circumscribes the spacing member and circumferentially encloses the cavities; and then joining the inner shell, the spacing member, the outer shell and the extension so that the fiber bundles are encased between the spacing member and the outer shell and so that the inner shell, the spacing member, the encasing shells, the outer shell and the extension define a metal matrix that surrounds and is bonded to the reinforcement fibers.

\* \* \* \* \*